INVENTOR.
A.B. BROERMAN
BY Hudson & Young
ATTORNEYS

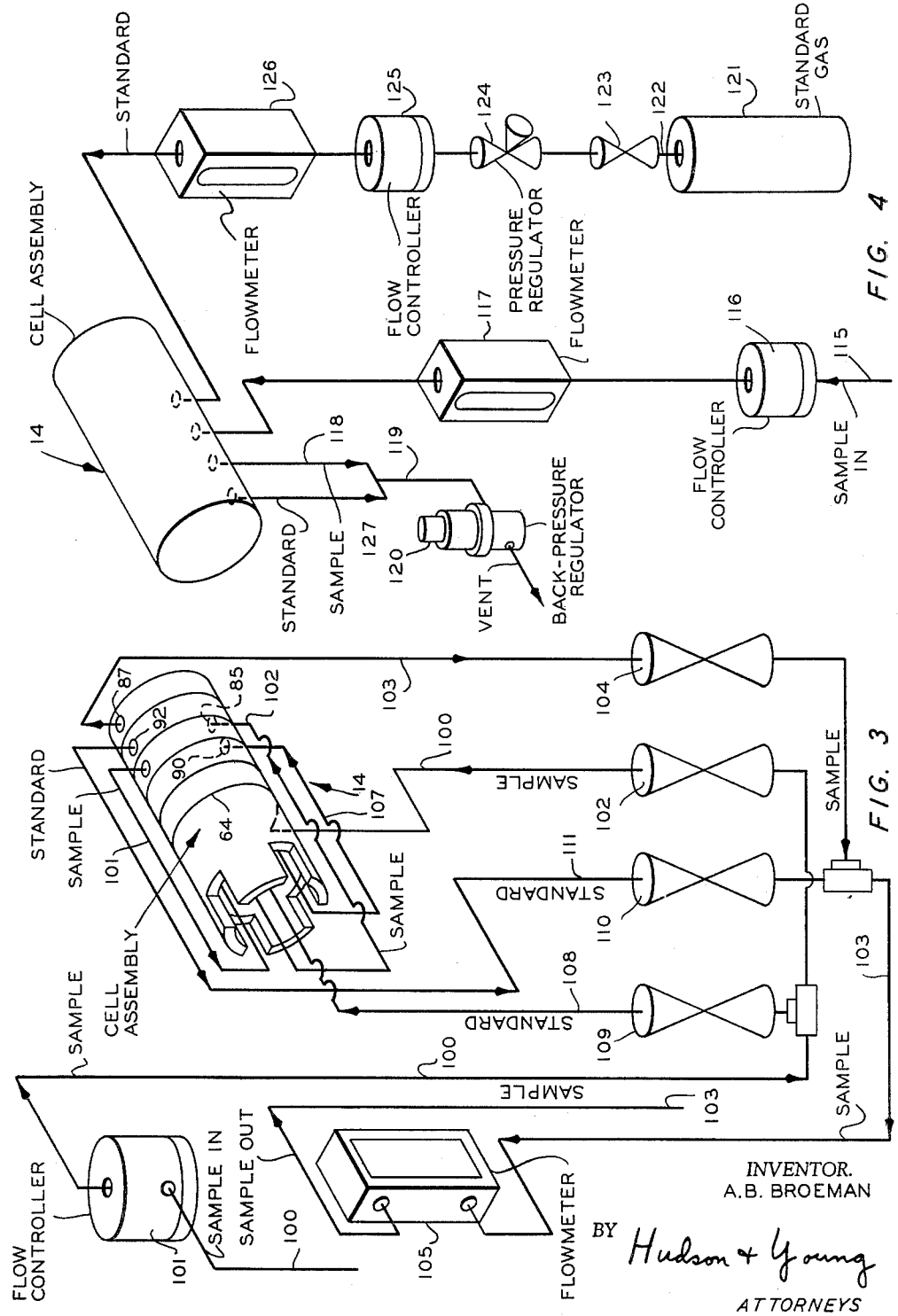

INVENTOR.
A.B. BROERMAN
BY Hudson & Young
ATTORNEYS

United States Patent Office 3,051,037
Patented Aug. 28, 1962

3,051,037
DIFFERENTIAL REFRACTOMETER
Arthur B. Broerman, Bartlesville, Okla., assignor to Phillips Petroleum Company, a corporation of Delaware
Filed Dec. 26, 1957, Ser. No. 705,311
2 Claims. (Cl. 88—14)

This invention relates to the measurement of the refractive indices of fluid streams.

In various chemical and petroleum operations it is a common practice to analyze a sample stream removed from some point in the process and to adjust an operating variable in response to the analysis to maintain desired conditions. One particular system of analysis that has proved to be useful involves measuring the refractive index of the sample stream. This measurement can advantageously be made by comparing the refractive index of the sample stream with the refractive index of a reference fluid. This is accomplished by directing a beam of radiation through a refractometer cell assembly and measuring the deviation of the emerging beam. The refractometer cell assembly is provided with two or more adjacent compartments which are separated by diagonal transparent plates. A reference fluid is positioned in one chamber and the sample fluid is circulated continuously through an adjacent chamber. An instrument of this type is generally referred to as a differential refractometer.

In order to make accurate measurements with differential refractometers, it is important that the two fluids being compared be maintained at the same temperatures and pressures. This is particularly true in measuring the refractive indices of gases because such refractive indices vary considerably with changes in temperature and pressure. In some applications of refractometers it is desirable to maintain the cell assembly at an elevated temperature. This is necessary when analyzing streams such as molten sulfur, ammonium nitrate solutions, ammonium sulfate solutions and polyolefins dissolved in hydrocarbon solvents because such streams tend to solidity at normal atmospheric temperatures. In analyzing certain hydrocarbon streams, such as the detection of small concentrations of pentanes in butane, it is necessary to maintain the stream at a sufficiently high temperature to maintain a gaseous phase in order to obtain the required sensitivity.

The refractometer of the present invention is particularly adapted to be operated at elevated temperatures. The cell assembly is mounted in a compact heat insulated housing which is separated from the remainder of the instrument. The electrical components are positioned in an explosion-proof housing. In accordance with one embodiment of this invention, apparatus is provided for comparing a sample fluid with a flowing reference fluid and for adjusting the pressures of the two fluids in the respective chambers of the cell assembly, thereby providing a means for adjusting the sensitivity of the instrument.

Accordingly, it is an object of this invention to provide an improved differential refractometer.

Another object is to provide an improved refractometer wherein two fluids being compared are maintained at common temperatures and pressures.

A further object is to provide a differential refractometer which is particularly adapted to analyze sample streams that are maintained at elevated temperatures.

A further object is to provide apparatus for changing the sensitivity of a differential refractometer.

A further object is to provide a refractometer wherein the refractive index of a first fluid stream is compared with the refractive index of a second fluid stream.

Other objects, advantages and features of this invention should become apparent from the following detailed description which is taken in conjunction with the accompanying drawing in which:

FIGURE 3 is a schematic drawing of a first embodiment of the fluid flow system in the refractometer of this invention.

FIGURE 4 is a schematic drawing of a second embodiment of the fluid flow system in the refractometer of this invention.

Figure 1:
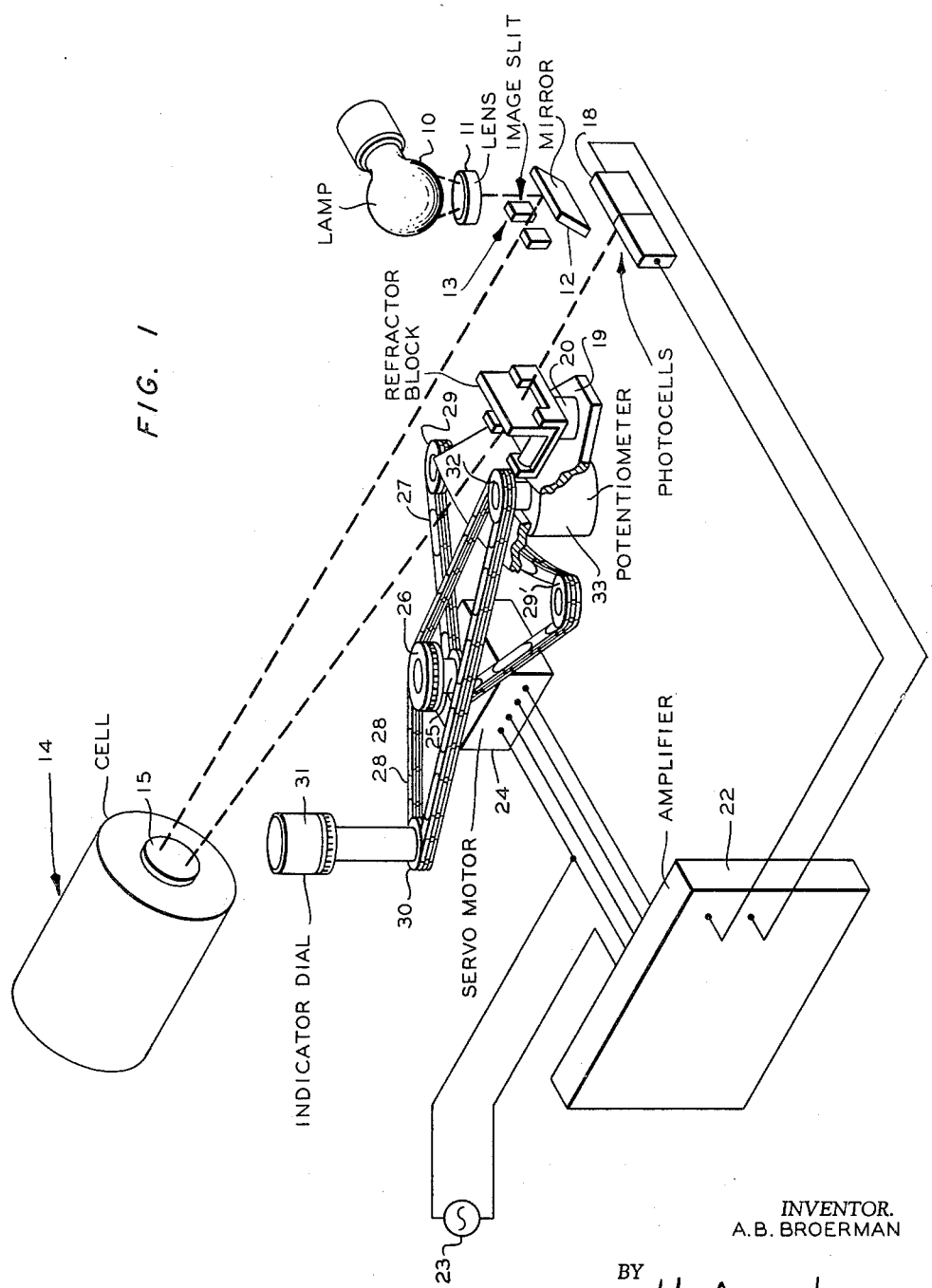
FIGURE 1 is a schematic view of a differential refractometer which incorporates features of this invention.

Referring now to the drawing in detail and to FIGURE 1 in particular, there is shown a lamp 10 which directs radiation through a condensing lens 11. The radiation transmitted through lens 11 is reflected by a mirror 12 through a slit assembly 13 into a refractometer cell assembly 14. Cell assembly 14 is provided with an inlet lens 15 which collimates radiation transmitted through slit 13. Lamp 10 can advantageously provide radiation in the visible spectrum. However, selected radiation in the infrared or ultraviolet spectrums can also be employed, if desired. Cell assembly 14, which comprises two chambers which are separated by a diagonal transparent plate, is described in detail hereinafter in conjunction with FIGURE 2. The radiation is transmitted through the two chambers and is reflected back through the chambers by means of a mirror. The reflected radiation emerges from cell assembly 14 through lens 15 and is directed through a refractor block 16 of transparent material to impinge upon adjacent photocells 17 and 18. Refractometer block 16 is mounted on a plate 19 which is free to pivot about an axis 20.

Photocells 17 and 18 are connected in electrical opposition to one another to the input of an amplifier circuit 22. This provides an output signal of polarity which depends upon the relative magnitudes of radiation impinging upon the two photocells. The output signal is zero when the two photocells receive equal amounts of radiation. Amplifier circuit 22 preferably is of the type which converts an input direct voltage into a corresponding output signal which is amplified. The amplified signal and a signal from an alternating current source 23 are applied to drive a reversible two-phase induction servo motor 24 in a direction which is representative of the polarity of the input signal applied to amplifier 22. This type of servo system can advantageously be of the form illustrated in The Electronic Control Handbook, Batcher and Moulic, Caldwell-Clements, Inc., New York, 1946, page 298.

The drive shaft of motor 24 carries two sprockets 25 and 26 which engage respective drive chains 27 and 28. Chain 27 extends around guide sprockets 29 and 29' and engages plate 19 to rotate same about axis 20, thereby rotating block 16. Chain 28 engages a sprocket 30, which is connected to an indicator dial 31, and to a sprocket 32, which is connected to a telemetering potentiometer 33. The rotation of motor 24 is thus indicated visually by dial 31, and this rotation can be converted into a corresponding electrical signal for controlling or recording processes by means of potentiometer 33. The instrument is balanced initially so that equal amounts of radiation impinge upon photocells 17 and 18. This is obtained when the refractive indices of the two fluids being compared are equal, or in a predetermined ratio. If the refractive index of the sample fluid changes, the beam emerging from cell assembly 14 is deviated so that one of the photocells receives more radiation than the other. This drives motor 24 in a direction to rotate block 16 so as to deviate the light beam in the opposite direction until the two photocells again are illuminated equally. The rotation of motor 24 is thus representative of the change in refractive index of the sample fluid.

Figure 2:
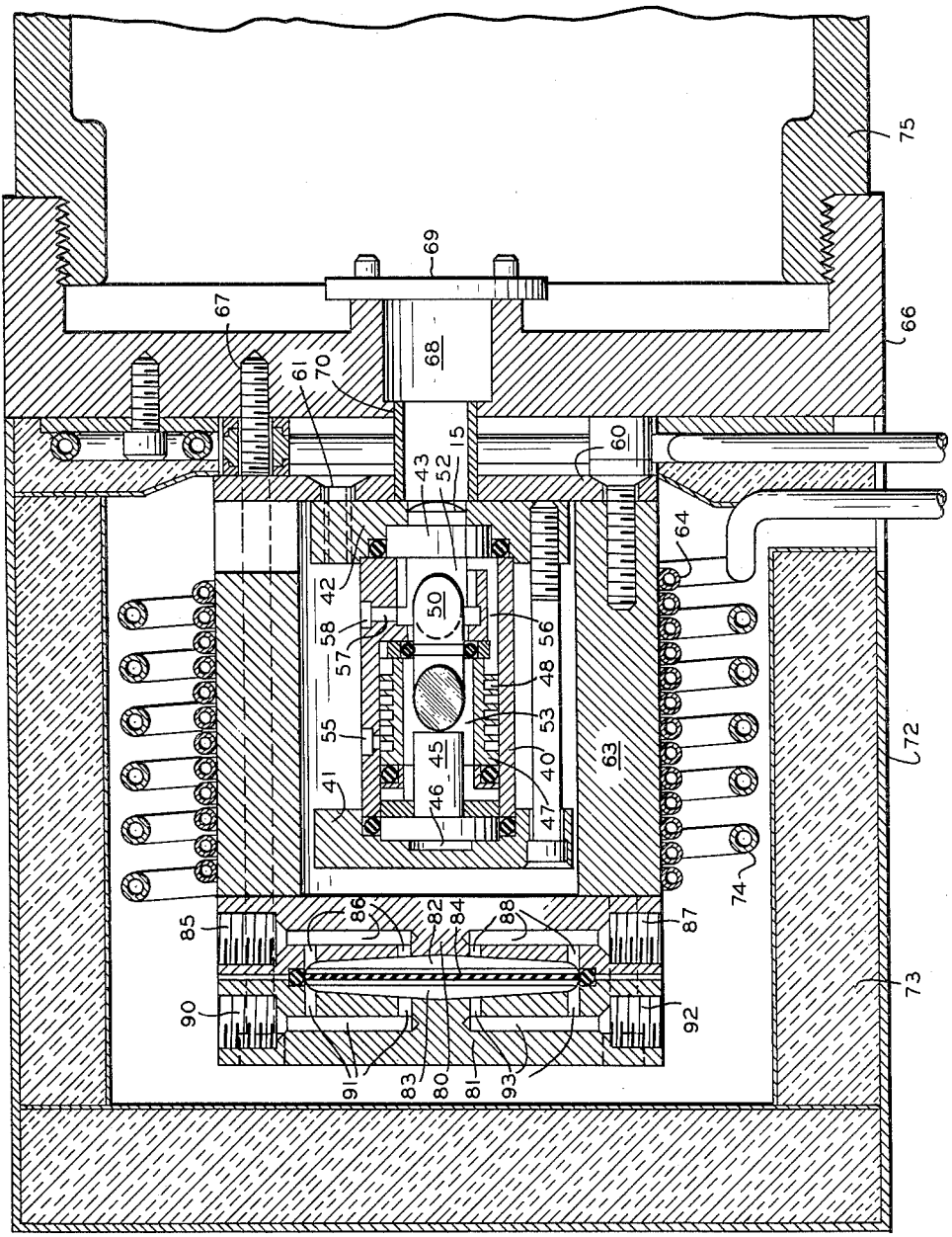
FIGURE 2 is a view, shown partly in section, of the cell assembly of the refractometer of FIGURE 1.

Refractometer cell assembly 14 is illustrated in detail in FIGURE 2. A cylindrical housing 40 is provided with respective end caps 41 and 42. A glass end plate 43 and lens 15 are retained across the first end of housing 40 by means of cap 42. The second end of housing 40 is closed by a flanged transparent plug 45 which has a mirror 46 connected thereto. Plug 45 extends into the interior of housing 40 and is retained in place by cap 41. A metal sleeve 47 having a spiral recess 48 in the periphery thereof is disposed in the center portion of housing 40. A cylindrical prism 50 divides the interior of housing 40 into respective chambers 52 and 53.

A sample fluid inlet port 55 in housing 40 is connected to the first end of spiral recess 48. The second end of recess 48 is connected by a passage 56 to chamber 52. A passage 57 extends between the opposite side of chamber 52 and an outlet port 58. The sample fluid to be measured enters through port 55 and passes through spiral recess 48 prior to its entry into chamber 52. This results in efficient heat exchange between the sample fluid and a reference fluid which is disposed in chamber 53 since sleeve 47 encloses chamber 53. Inlet and outlet openings, not shown in FIGURE 2, communicate with chamber 53 to permit the introduction and withdrawal of a reference fluid.

Plug 45 serves two important functions. It reduces the volume of reference fluid in chamber 53 so as to provide more efficient heat exchange between the fluids in the two chambers. It also shortens the radiation path through the fluid in chamber 53 so that more opaque reference fluids can be employed, if necessary. In order to provide different sensitivities, the angle which the ends of the prism make with the optical axis of the cell assembly can be adjusted by the use of different prisms. It is generally desired that this angle be a maximum from 90° to provide the greatest refraction of the transmitted light beam.

The cell assembly thus far described is attached to a cylindrical plate 60 by means of screws 61 which engage end plate 42. The cell assembly is surrounded by a heavy cylindrical housing 63 which is formed of a material having good heat conducting properties, such as copper. A tube 64 is coiled about housing 63 so as to make thermal contact therewith. The sample fluid to be measured is circulated through tube 64 prior to its induction into chamber 52. The connecting conduit between tube 64 and port 55 has been omitted from the drawing for simplicity.

Plate 60 is attached to a cylindrical plate 66 by means of screws 67. A glass cylinder 68 is secured across the center portion of plate 66 by means of a glass plate 69. This provides the radiation inlet and outlet for the cell assembly. A sleeve 70 forms a light passage between cell 68 and lens 15. A cylindrical cover plate 72 is attached to plate 66 to enclose the entire cell assembly, and a mass of heat insulating material 73 is attached to the inside of cover plate 72 so as to insulate the cell assembly thermally from the surrounding atmosphere. If it is desired to operate the cell assembly at elevated temperatures, a coil 74 is provided through which steam or other heating material can be circulated. A thermostat can also be provided to maintain a constant temperature. An explosion-proof housing 75 is threaded to plate 66 to enclose the optical and electrical components of the refractometer which are shown in FIGURE 1.

As previously mentioned, it is important that the pressures of the fluids being compared be maintained the same. This is accomplished in part by means of a pressure equalizer assembly which is attached to housing 63. First and second blocks 80 and 81 are secured to one another and to housing 63. These blocks are provided with respective recesses 82 and 83 which are separated by a flexible diaphragm 84. Recess 82 communicates with an inlet port 85 in block 80 through passages 86 and with an outlet port 87 in block 80 through passages 88. Recess 83 communicates with an inlet port 90 in block 81 through passages 91 and with an outlet port 92 in block 81 through passages 93. The reference fluid in chamber 53 fills recess 83, and the sample fluid circulated through chamber 52 circulates through recess 82. If there is any pressure difference between these two fluids, diaphragm 84 is moved to change the relative volumes of the recesses to equalize small pressure changes. The connecting conduits between chambers 52 and 53 of the cell assembly and the recesses of the pressure equalizer have also been omitted from FIGURE 2 of the drawing for simplicity.

A first embodiment of the fluid flow system is illustrated in FIGURE 3. The sample fluid to be analyzed is introduced through a conduit 100 which passes through a flow controller 101 and a valve 102 to communicate with coil 64. The second end of coil 64 communicates with port 55 of FIGURE 2 through a conduit 101. The sample fluid withdrawn from port 58 of FIGURE 2 is directed through a conduit 102 to inlet port 85 of the pressure equalizer. The sample fluid withdrawn from port 87 is vented from the system through a conduit 103 which has a valve 104 therein. A flowmeter 105 is disposed in conduit 103 to provide an indication of the rate of flow of the sample stream through the system. In one mode of operation, the standard fluid is locked into the system so as to fill chamber 53 and recess 83. Chamber 53 of the cell assembly is connected to port 90 of the pressure equalizer by means of a conduit 107. A conduit 108 communicates between the fluid inlet port of chamber 53 and the first port of a valve 109. The second port of valve 109 communicates with conduit 100 upstream from valve 102 so that standard fluid can be introduced into the system initially by closing valve 102 and opening valve 109. Outlet port 92 of the pressure equalizer communicates with the first port of a valve 110 by means of a conduit 111. The second port of valve 110 communicates with conduit 103 so that the standard fluid can initially be circulated through the system at the time chamber 53 and recess 83 are filled. Valves 109 and 110 are then closed to lock this reference fluid in the system.

In some applications of the refractometer, it is desirable that the reference fluid actually be circulated continuously through the cell assembly. This permits the refractive index of a first stream to be compared with the refractive index of a second stream, for example. This can be accomplished by means of the apparatus illustrated in FIGURE 4. The sample fluid is introduced into the cell assembly through a conduit 115 which has a flow controller 116 and a flowmeter 117 therein. This sample fluid is removed from the cell assembly through conduits 118 and 119, the latter having a back-pressure regulator 120 therein. The reference fluid can be supplied from a container 121. Container 121 is connected to the inlet of the cell assembly by means of a conduit 122 which has a valve 123, a pressure regulator 124, a flow controller 125 and a flowmeter 126 therein. The reference fluid is removed from the cell assembly through a conduit 127 which communicates with conduit 119. The flows of the two fluids can be regulated by means of respective controllers 116 and 125, and preferably are maintained equal. Back-pressure regulator 120 is adjustable to permit any desired pressure to be maintained in the two chambers of the cell assembly. The diaphragm pressure regulator illustrated in FIGURE 2 is not required in this system because of the common back pressure regulator in the outlet conduits.

Figure 5:
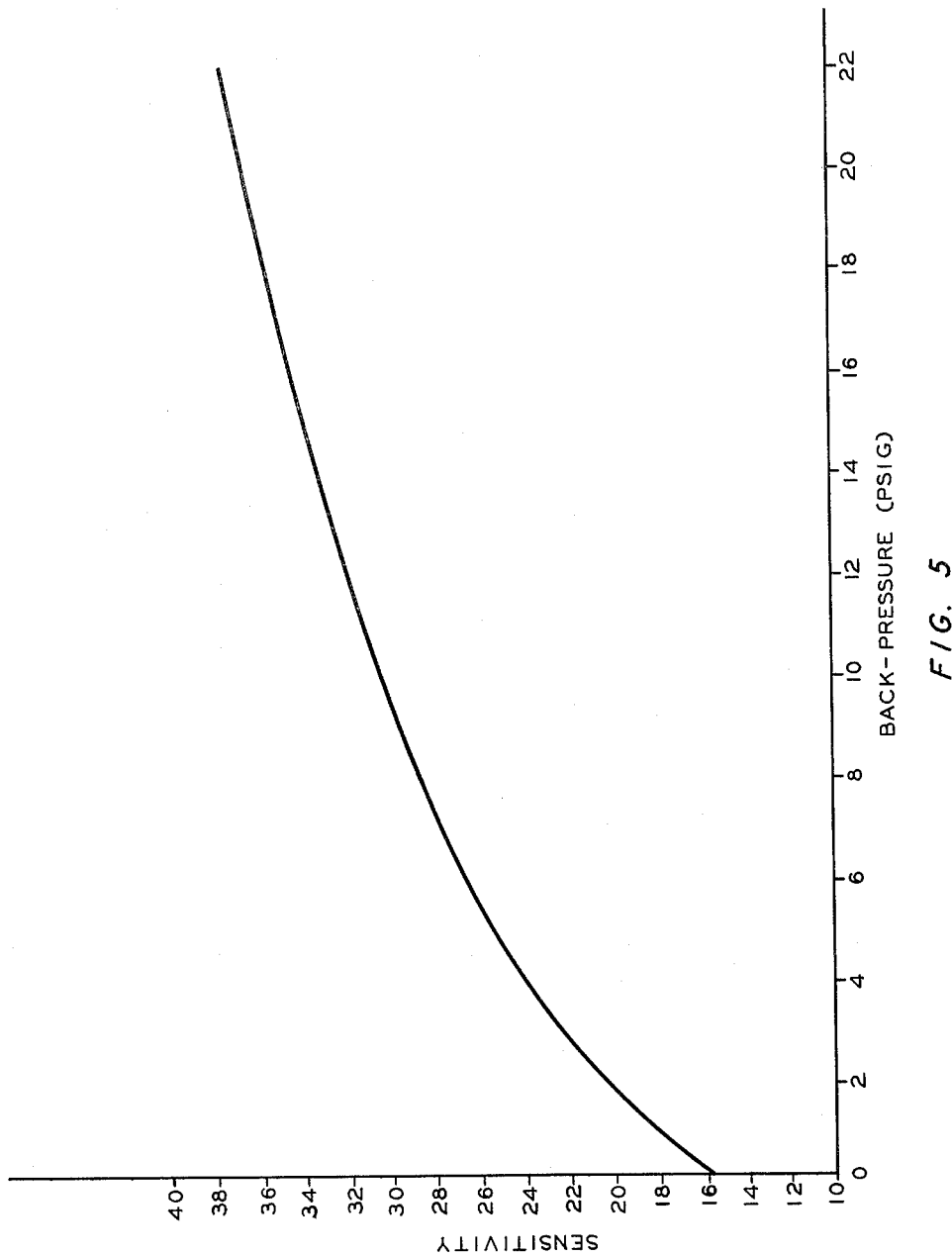
FIGURE 5 is a graphical representation of an operating feature of a refractometer provided with the flow system of FIGURE 4.

The adjustable back-pressure regulator serves an additional important function in that it readily permits the sensitivity of the instrument to be adjusted. This is illustrated by the graph of FIGURE 5. A sample fluid containing approximately 2% total pentanes and approximately 98% butane was introduced into the system of FIGURE 4 through sample conduit 115. Container 121 was filled with normal butane. The refractometer was operated at a sufficiently high temperature to maintain the fluid streams in a gaseous state. This is necessary in order to obtain sufficient sensitivity to detect small amounts of pentanes in butane. The pressure of the two fluids in the cell assembly was varied from 0 to 22 pounds per square inch gauge. The resulting sensitivity of the instrument is shown in FIGURE 5. The indicated values of the curve represent the amount of deflection of the light beam at the different back pressure. It can readily be seen that the sensitivity of the instrument increased substantially as the pressure of the two fluids was increased. If the two fluids have the same composition, a change in pressure does not deflect the light beam. However, the pentanes in the sample stream exert a progressively greater influence on the refractive index as the pressure increases. Thus, the sensitivity of the instrument can readily be adjusted by back-pressure regulator 120.

From the foregoing description it should be evident that there is provided in accordance with this invention an improved differential refractometer which is particularly adapted for use at elevated temperatures. Apparatus is also provided for adjusting pressures with a refractometer cell assembly so as to permit adjustment of the sensitivity of the instrument. This is important when a variety of different streams are to be measured or when the composition changes appreciably.

While the invention has been described in conjunction with present preferred embodiments, it should be evident that it is not limited thereto.

What is claimed is:

1. Apparatus for measuring the refractive index of a fluid comprising a first plate having a radiation transparent opening therein, a cell assembly having first and second adjacent chambers separated by a second radiation transparent plate, a mirror positioned across one end of said cell assembly, first conduit means communicating with said first chamber to introduce a sample fluid therein, second conduit means communicating with said second chamber to introduce a reference fluid therein, third conduit means communicating with said first and second chambers to withdraw fluids therefrom, an adjustable back-pressure regulator in said third conduit means to maintain a predetermined adjustable absolute pressure in said third conduit means whereby the ratio of pressures and absolute pressures in said first and said second chambers can be maintained at a predetermined constant value, a source of radiation positioned on one side of said first plate, means to direct a beam of radiation through the opening in said first plate, means positioning said cell assembly on the second side of said first plate so that said beam of radiation passes through said chambers and is reflected by said mirror back through said chambers and said opening, means to measure the deviation of the reflected beam which represents the difference between the refractive indices of fluids in said first and second chambers, a first housing connected to said first plate and enclosing said cell assembly, a second housing connected to said first plate and enclosing said source of radiation and said means to measure, means connected to said first housing to maintain the interior thereof at an elevated temperature, and heat insulating means enclosing said cell assembly.

2. Apparatus for measuring the refractive index of a gas comprising a first plate having a radiation transparent opening therein, a cell assembly having first and second adjacent chambers separated by a second radiation transparent plate, a mirror positioned across one end of said cell assembly, first conduit means communicating with said first chamber to introduce a gas to be analyzed, first flow control means in said first conduit means to maintain a predetermined constant flow through said first conduit means, a source of reference gas under pressure, second conduit means communicating between said source of reference gas and said second chamber, a pressure regulator in said second conduit means, second flow control means in said second conduit means to maintain a predetermined constant flow through said second conduit means, third conduit means communicating with said first and second chambers to withdraw gases therefrom, an adjustable back-pressure regulator in said third conduit means to maintain a predetermined adjustable absolute pressure in said third conduit means whereby the ratio of pressures and absolute pressures in said first and said second chambers can be maintained at a predetermined constant value, a source of radiation positioned on one side of said first plate, means to direct a beam of radiation through the opening in said first plate, means positioning said cell assembly on the second side of said first plate so that said beam of radiation passes through said chambers and is reflected by said mirror back through said chambers and said opening, means to measure the deviation of the reflected beam which represents the difference between the refractive indices of fluids in said first and second chambers, a first housing connected to said first plate and enclosing said cell assembly, a second housing connected to said first plate and enclosing said source of radiation and said means to measure, means connected to said first housing to maintain the interior thereof at an elevated temperature, and heat insulating means enclosing said cell assembly.

References Cited in the file of this patent

UNITED STATES PATENTS

| | | |
|---|---|---|
| 2,583,973 | Stamm et al. | Jan. 29, 1952 |
| 2,594,405 | Deters | Apr. 29, 1952 |
| 2,724,304 | Crawford | Nov. 22, 1955 |
| 2,736,332 | Simmons | Feb. 28, 1956 |
| 2,771,149 | Miller et al. | Nov. 20, 1956 |
| 2,857,799 | Miller et al. | Oct. 28, 1958 |
| 2,890,571 | Miller | June 16, 1959 |
| 2,902,048 | Ryan | Sept. 1, 1959 |